B. D. Stevens,
Axe Handle.

N° 78,550.  Patented June 2, 1868.

Witnesses:
P. S. Smout
D. Tanner

Inventor:
Benj'n D. Stevens,

UNITED STATES PATENT OFFICE.

BENJAMIN D. STEVENS, OF DECORAH, IOWA.

IMPROVEMENT IN AX-HANDLES.

Specification forming part of Letters Patent No. 78,550, dated June 2, 1868; antedated May 18, 1868.

*To all whom it may concern:*

Be it known that I, BENJM. D. STEVENS, of Decorah, in the county of Winneshiek and State of Iowa, have invented a new and improved method of lessening the strain on the handles of axes and hammers or any instrument or tool exposed to concussion, and which I call "Stevens' Handle-Saver;" and I do hereby declare that the following is a full and exact description thereof, reference being had to the accompanying drawings, making part of this specification, in which—

Figure 1:
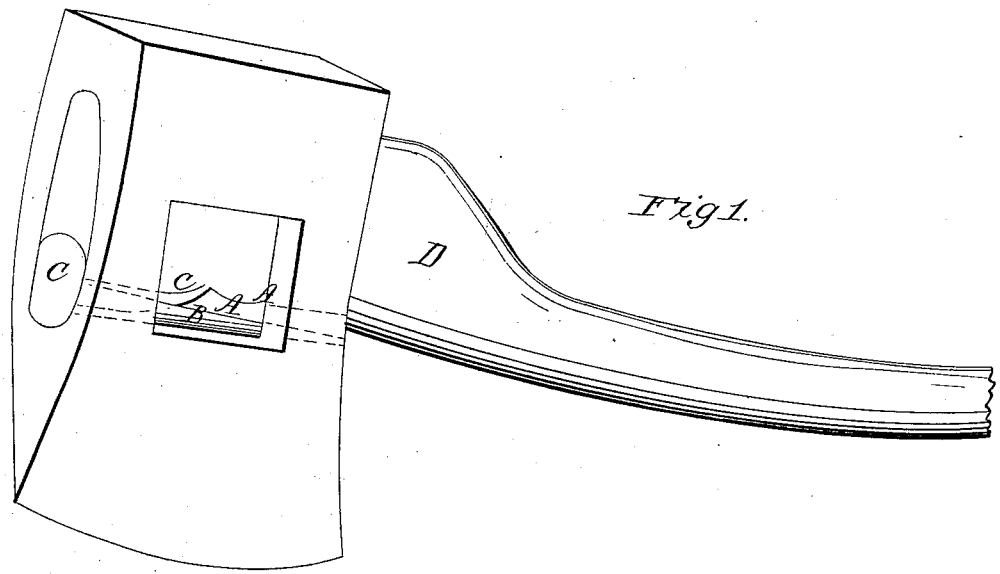
Figure 2:
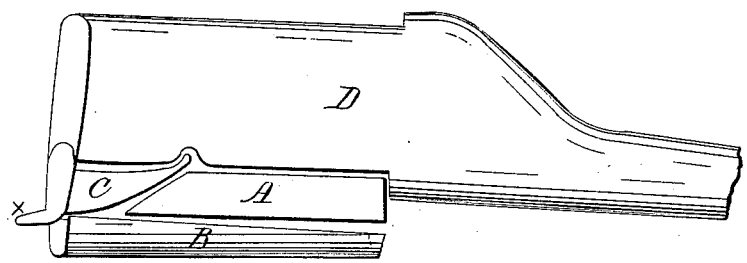

Figure 1 is a perspective view of my invention as applied to an ax, a square piece being cut out of the side of the ax to exhibit the arrangement of the handle and spring; and Fig. 2, the handle and parts more in detail.

Those who are accustomed to use hammers or other similar implements know that the handle, after being used a length of time, splinters and breaks up, on account of the violent reaction of the hammer; and to avoid this reaction some make the handle thin and light near the head, thus allowing it to spring, but very materially reducing its strength.

To reduce the effect of the rebound on the handle and allow it to be of full size and strength is the object of this invention.

To enable others skillful in the art to make and use my invention, I will proceed to describe its construction and operation.

I make the eye of the ax or hammer and also the handle of any of the usual forms, and below or above the handle, or both, and between the handle and ax or hammer, I place a piece of india-rubber or gutta-percha or any other kind of a spring in such a manner and position, as at A, Figs. 1 and 2, as will take the rebound or recoil of the tool off the handle. Below the rubber I place sheath B, Figs. 1 and 2, which is driven in with the handle, compressing the rubber and preventing it from abrasion.

The handle D is kept from coming out by the peculiar-shaped wedge C, the point of which enters upward into the handle. This wedge has a flange which projects forward, as at X, when the handle is being driven in, and when the handle is fully in this flange is flattened down over the ax or hammer, and the point of the wedge, entering upward into the handle, holds it firmly and solidly in.

What I claim as my invention, and desire to receive by Letters Patent, is—

1. Inserting india-rubber or similar elastic substance in the eye of axes, hammers, and analogous tools when placed in the position, for the purpose substantially as described.

2. The wedge C, when constructed and used as and for the purpose set forth.

In testimony that I claim the foregoing as my own I affix my signature in presence of two witnesses.

BENJM. D. STEVENS.

Witnesses:
CYRUS MCKAY,
DAN LAURENCE.